United States Patent
Balogh et al.

(10) Patent No.: US 6,535,736 B1
(45) Date of Patent: Mar. 18, 2003

(54) SYSTEM AND METHOD FOR VARIABLY DELAYING ACCESS REQUESTS IN WIRELESS COMMUNICATIONS SYSTEM

(75) Inventors: Dan Anthony Balogh, Madison, NJ (US); John K. Burgess, Morristown, NJ (US); Terry Si-Fong Cheng, Randolph, NJ (US); Ching Yao Huang, Randolph, NJ (US); Shawn S. Yu, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/210,019

(22) Filed: Dec. 11, 1998

(51) Int. Cl.[7] ............................................. H04Q 7/20
(52) U.S. Cl. ........................ 455/434; 455/450; 455/515
(58) Field of Search ............................... 455/434, 423, 455/424, 450, 452, 458, 464, 515, 516, 453

(56) References Cited

U.S. PATENT DOCUMENTS

| | | |
|---|---|---|
| 4,315,262 A | 2/1982 | Acampora et al. |
| 4,654,867 A | 3/1987 | Labedz et al. |
| 5,056,109 A | 10/1991 | Gilhousen et al. |
| 5,073,900 A | 12/1991 | Mallinckrodt |
| 5,134,709 A | 7/1992 | Bi et al. |
| 5,276,730 A | 1/1994 | Cimini et al. |
| 5,276,907 A | 1/1994 | Meidan |
| 5,278,892 A | 1/1994 | Bolliger et al. |
| 5,289,526 A | 2/1994 | Chymyck et al. |
| 5,295,152 A | 3/1994 | Gudmundson et al. |
| 5,371,780 A | 12/1994 | Amitay |
| 5,437,054 A | 7/1995 | Rappaport et al. |
| 5,448,761 A | 9/1995 | Ushirokawa et al. |
| 5,490,087 A | 2/1996 | Redden et al. |
| 5,519,691 A | 5/1996 | Darcie et al. |
| 5,544,196 A | 8/1996 | Tiedemann et al. |
| 5,564,025 A | 10/1996 | DeFreese et al. |
| 5,594,740 A | 1/1997 | LaDue |
| 5,619,524 A | 4/1997 | Ling |
| 5,627,835 A | 5/1997 | Witter |
| 5,669,062 A | 9/1997 | Olds et al. |
| 5,696,762 A | 12/1997 | Natali et al. |
| 5,729,531 A | 3/1998 | Raith et al. |
| 5,734,646 A | 3/1998 | Chih-Lin et al. |
| 5,734,980 A | 3/1998 | Hooper et al. |
| 5,757,846 A | 5/1998 | Vasudevan |
| 5,778,030 A | 7/1998 | Bruckert et al. |
| 5,790,534 A | 8/1998 | Kokko et al. |
| 5,924,026 A * | 7/1999 | Krishnan ................... 455/414 |
| 6,111,867 A * | 8/2000 | Mann et al. ................. 455/515 |
| 6,118,997 A * | 9/2000 | Kim et al. .................. 455/424 |

* cited by examiner

*Primary Examiner*—Edward F. Urban
*Assistant Examiner*—Tilahun Gesesse
(74) *Attorney, Agent, or Firm*—William Ryan

(57) ABSTRACT

The present invention, in illustrative embodiments, implements systems and methods for adjusting the timing of access requests in mobile communications systems, such as IS-95-A mobile telephone systems, to reduce the likelihood of request collisions—especially during periods of very high calling rates. These embodiments employ measurements of access channel occupancy, as well as system operator inputs, to develop thresholds and parameter translations at a base station. Execution of control algorithms at a base station advantageously yields modified persistence test parameters sent to mobile stations. When overload conditions are present, these modified parameters cause the mobile stations to experience variable delays through judicious control of persistence testing at the mobile stations.

22 Claims, 5 Drawing Sheets

SYSTEM AND METHOD FOR VARIABLY DELAYING ACCESS REQUESTS IN WIRELESS COMMUNICATIONS SYSTEM

FIELD OF THE INVENTION

The present invention relates generally to the field of telecommunications. More particularly, the present invention relates, in one aspect, to access to communications system resources. Still more particularly, aspects of the present invention relate to control of access to mobile communications facilities.

BACKGROUND OF THE INVENTION

Many communications systems, and systems employing communications as an integral part of their infrastructure, rely on access to available links and other facilities having at least some minimum available communications capacity. As a most common example, reliance is routinely placed on the availability of dial tone for placing traditional plain-old-telephone-service (POTS) calls. In the context of modem cellular and personal communications systems, the availability of an access channel plays an analogous role. In yet other circumstances, ongoing processes at a distributed system node rely on responses from other processor-based systems, such as database systems or special-purpose processor nodes.

When expectations for capacity or availability are not immediately fulfilled, e.g., because of link or system capacity limitations, service seekers frequently repeat requests for service. Such repeat requests add to the demands placed on the capacity-limited link or element, and service demands increase still farther, potentially to the point that little, if any, service capacity is available for any requester.

Many congestion control techniques have been employed in the public switched telephone network for dealing with an overload of POTS calls originating at or near (or directed to) the location of public emergencies, natural disasters and the like. Many of these techniques seek to limit or throttle originations (or terminations) of calls from (or to) the affected area. For example, it has long been a practice in administering telecommunications networks to provide selective call blocking or call-gapping treatment to calls to a particular telephone number or group of numbers. Situations in which such call-gapping techniques are applied include "call-ins" to numbers for radio or TV call-in shows that experience a concentrated volume of calling in response to contest offers or celebrity appearances.

In mobile telephone systems, events can also occur which trigger an abnormally large number of subscribers to attempt to originate mobile phone calls at the same time for processing by a common base station. This surge of system accesses in a localized area is sometimes said to result in "collisions," and the overall condition at such a base station is known as a "hotspot." Such hotspots can occur under extreme circumstances regardless of the number of access channels provisioned in the system. Moreover, since system accesses use the same frequency band as the traffic channels, the abnormally high system access rate increases RF interference on all carriers with access channels. This can result in the dropping of weaker calls on traffic channels using those carriers.

Merely adding access channels serving a cell (or sector, or other area), or adding more cells, may mitigate or reduce the probability of an overload condition, but will not eliminate the problem. Any location may be subject to hotspot activity in the event of a natural disaster, act of terrorism, or other traumatic unanticipated localized event. Provisioning access channels to meet such extreme overload conditions is, in any event, an uneconomic solution.

In illustrative wireless systems, a base station seeks to enhance its ability to distinguish among mobile stations simultaneously seeking to transmit messages over an access channel by using a variety of randomization techniques. One of these is known as "backoff randomization" and another is a randomization technique employing so-called "persistence testing." These randomization techniques are in addition to so-called PN randomization based, at least in part, on the identity of the calling mobile stations. Still other randomization techniques, including so-called channel randomization, are sometimes used to distribute the arrival of attempted call originations from mobile stations at a base station. While these approaches contribute significantly to the efficient use of access channels, they, too, cannot effectively deal with many hotspot conditions.

A special consideration in introducing access controls that could be imposed in emergency situations is that those mobile stations (mobiles) having an overload class programmed "emergency" must continue to receive priority access to the system. In addition, any such controls should be imposed with a reasonable degree of fairness as between those non-emergency users competing for available resources.

Among the other considerations in designing access overload treatments for mobile stations is that compatibility with existing standards-based functionality must be maintained. As an example, technical industry standards that are desirably observed in introducing access controls in mobile communications system are IS-95-A+TSB Mobile Station-Base Station Compatibility Standard for Dual-Mode Wideband Spread Spectrum Cellular System (March, 1995); and ANSI J-STD-008 Personal Station-Base Station Compatibility Requirements for 1.8 to 2.0 GHz Code Division Multiple Access (CDMA) Personal Communications Systems, (Corrected Version—Aug. 29, 1995).

SUMMARY OF THE INVENTION

Limitations of the prior art are overcome and a technical advance is made in accordance with the present invention described in illustrative embodiments herein.

To maintain system integrity, and to avoid unnecessary dropping of existing calls, typical embodiments of the present invention detect access channel overload as it occurs and apply controls to maintain a sustainable rate of system accesses without affecting mobiles programmed with emergency overload class capability. More particularly, illustrative embodiments of the present invention monitor occupancy in each access channel to detect or predict an access overload condition. Such measurements advantageously use one or more service-provider-selected thresholds in determining when access channel overload control is initiated.

It proves convenient to employ access control messages from the system being accessed, e.g., a cellular or PCS wireless base station, to accessing terminals, e.g., mobile terminals, to adjust certain access parameters. In an illustrative embodiment based on the IS-95 spread-spectrum CDMA standard, it proves convenient to employ modified test parameters for known persistence tests to reflect overload conditions requiring prescribed control measures. Use of existing persistence tests typically causes mobiles of specified overload classes to incur additional random delay (including delays tantamount to blocking) before every request access probe sequence.

In accordance with present inventive teachings, illustrative overload algorithms use current occupancy readings and control settings currently in effect to determine adjustments to be made to persistence test parameters for normal mobiles (overload classes 0–9), and access channel parameters for all mobiles. Such adjustments prevent access channel usage from exceeding its allotted capacity, while avoiding unfairness as between normal mobile users.

System administration techniques advantageously provide for periodic system measurements of the number of times access channel overload control was invoked and the total duration of all overload conditions for meaningful periods (such as for each hour). Such administration techniques provide a tool for Craft to help determine what is actually happening at a site and can aid in determining the true nature of hotspot activities.

BRIEF DESCRIPTION OF THE DRAWING

The above-summarized description of illustrative embodiments of the present invention will be more fully understood upon consideration of the following detailed description and the attached drawing, wherein.

DETAILED DESCRIPTION

One important area of application for embodiments of the current invention is that of digital cellular and PCS mobile communications systems, such as those specified and described in the above-referenced standards, and as are well known to those skilled in the cellular and PCS communications arts. Other useful references in gaining a fuller understanding of these contexts are: *Wireless PCS*, by R. Kuruppillai, M. Dontamsetti and F. J. Consentino, McGraw-Hill, 1997; and *Wireless Personal Communications Systems*, by D. J. Goodman, Addison-Wesley, 1997.

The following detailed description will proceed in the illustrative context of a CDMA mobile communications system based on the well-known ANSI IS-95-A standard. Such context should not be considered as limiting on the applicability of the present inventive teachings, nor on the scope of the appended claims.

Systems such as those based on the IS-95-A standard are, of course, rich in nomenclature and defined terms. Several of these will appear in the sequel, but it is worth noting initially use of the term "chip" to define a binary signaling element in a digital spread spectrum carrier. This usage is distinguished from source bits and other system units, and is well known in the art.

As is also well known in the art, calls between a CDMA mobile station and a base station typically employ several kinds of channels. Initially, a pilot channel is employed to continually broadcast certain system synchronization and timing information to all mobile stations in an area. After initial synchronization is achieved at a mobile station, a sync channel is used to establish more specific time and frame synchronization at the mobile station. The sync channel message also provides information about another class of channels, the paging channels.

Paging channels are used to broadcast a variety of control information, including access channel information, contained in an access parameter message. This access parameter message contains information such as initial access power requirements, the number of access channels, the number of access attempts, maximum size of access messages, values for various overload classes, access attempt backoff parameters and other information of interest to mobiles seeking access to the base.

When no call is in progress between a base and a mobile, the access channel(s) are used, for example, to originate a call, to respond to a message sent over a paging channel, and to supply registration location with one or more base stations. The IS-95-A standard cited above provides a detailed sequence of activities that are to be followed in transmitting messages over an access channel to a base station.

Figure 1:
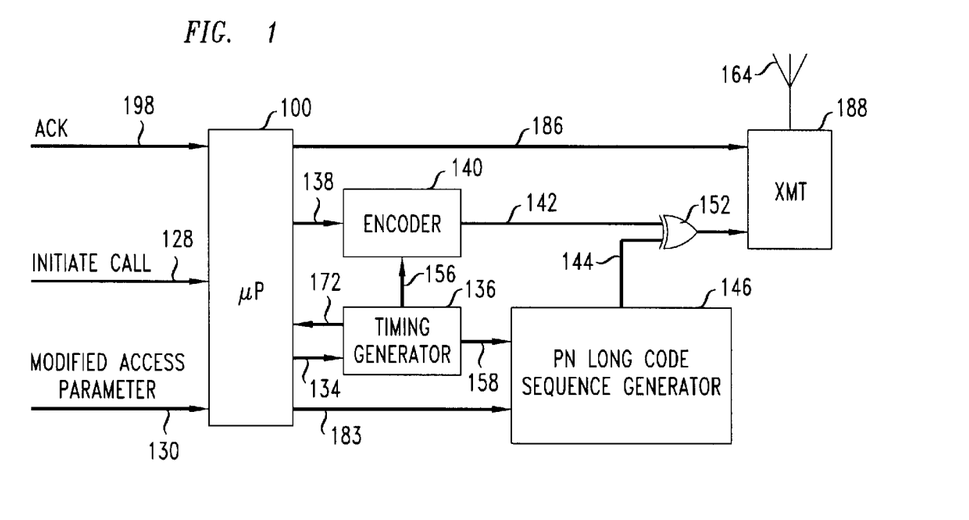
FIG. 1 shows an illustrative embodiment of the present invention in a system for introducing additional random delays at a CDMA wireless mobile station.
Figure 2:
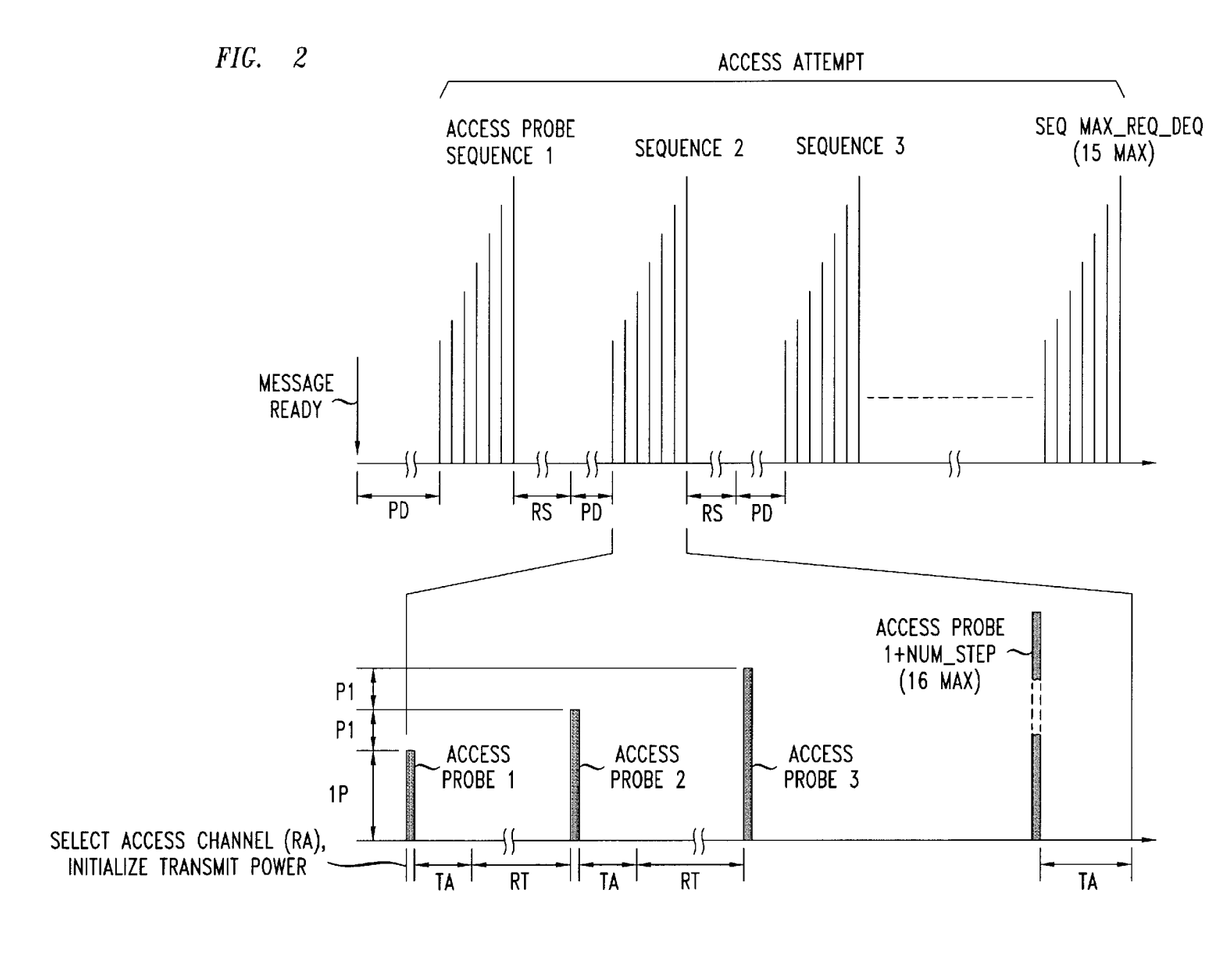
FIG. 2 shows timing for illustrative access probe sequences in accordance with an aspect of the present invention.
Figure 3:
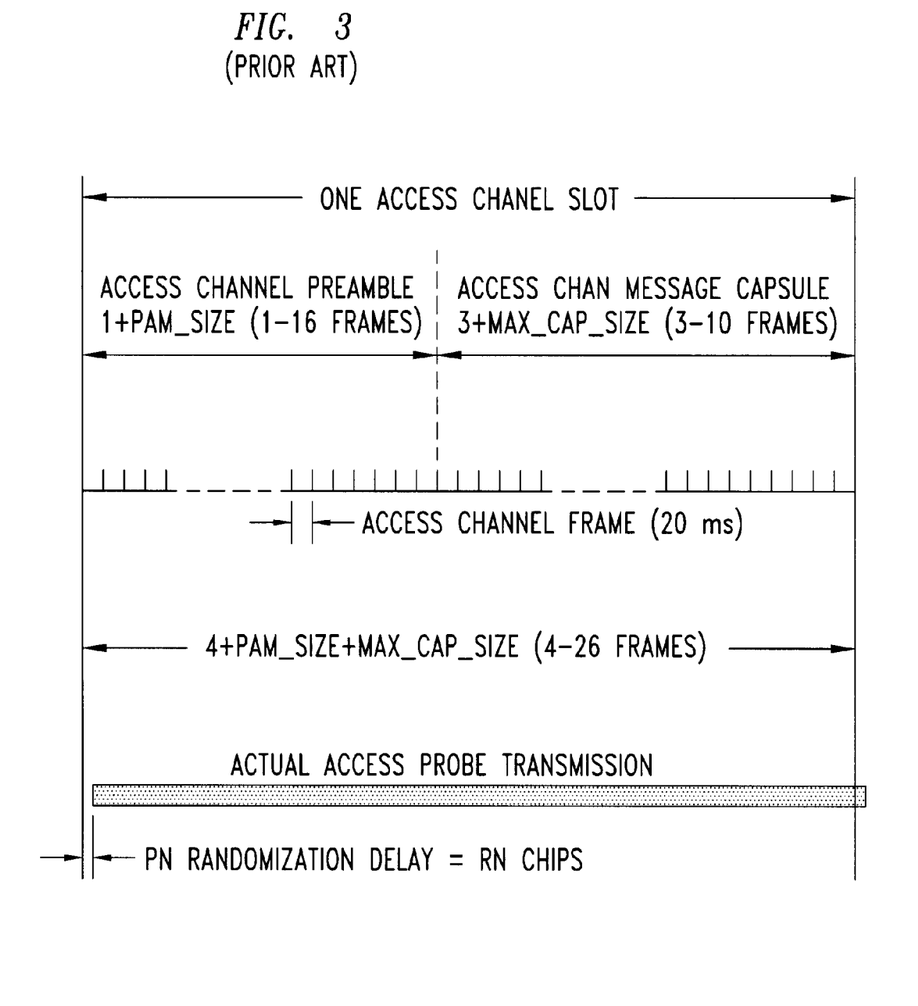
FIG. 3 is a representation of timing aspects of an access request from a typical mobile station.
Figure 4:
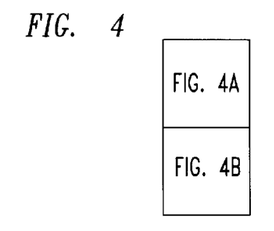
FIGS. 4A and 4B, taken together, are a flowchart showing illustrative processing steps performed in introducing access delays in known systems.
Figure 4A:
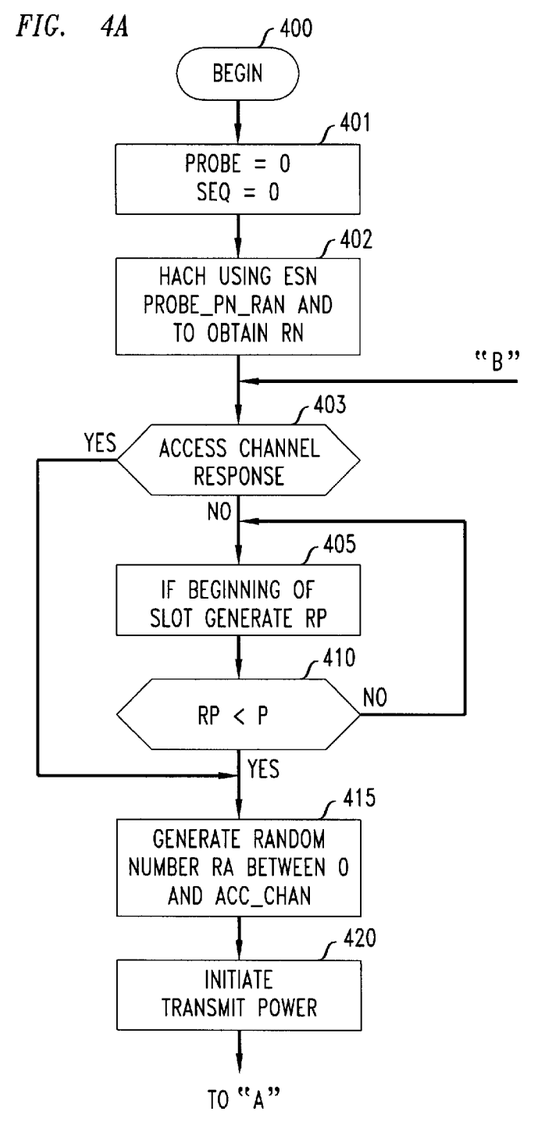
Figure 4B:
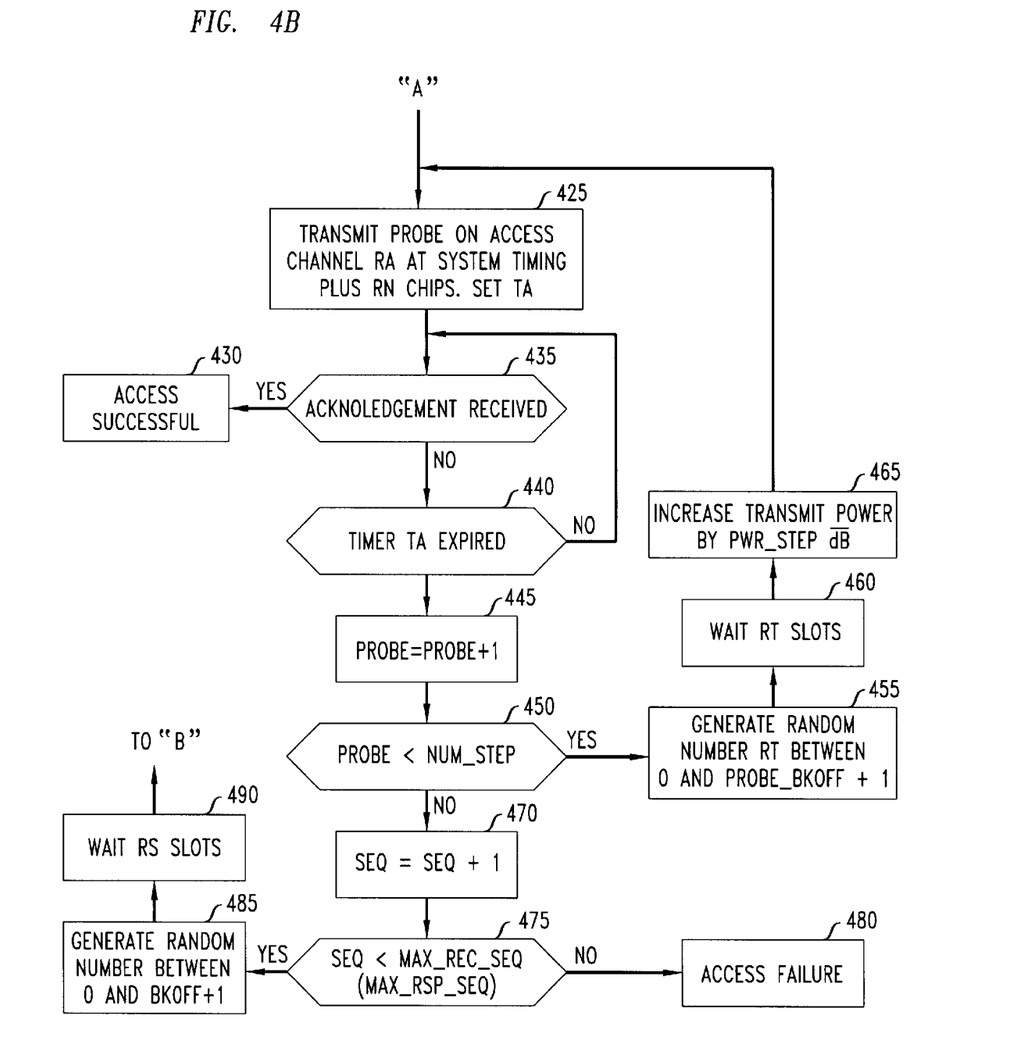

In systems based on the IS-95-A standard, CDMA mobiles transmit on the access channels according to a random access protocol. A flowchart illustrating aspects of the CDMA mobile access protocol is shown in FIGS. 4A and 4B, which flowchart will be discussed in more detail below. The entire process of sending one message and receiving (or failing to receive) an acknowledgment for that message is called an access attempt. Each transmission in the access attempt is called an access probe. The mobile transmits the same message in each access probe of an access attempt. Each such access probe comprises an access channel preamble and an access channel message capsule. FIG. 2 illustrates some timing relationships between various system values used in IS-95-A-based systems. The length of the preamble 1+pam_sz as well as the length of message capsule 3+max_cap_sz are expressed in terms of a number of 20 millisecond frames. Thus, the duration of an access probe (access channel slot) is 4+pam_sz+max_cap_sz frames.

Within an access attempt, access probes are grouped into an access probe sequence. Two types of messages are typically sent on the access channel: a response message (one that is a response to a base station message, see FIG. 4), or a request message (one that is sent autonomously by the mobile, see FIG. 5). Each access attempt comprises up to max_req_seq (for a request access) or max_rsp_seq (for a response access) access probe sequences.

The timing of the start of each access probe sequence is determined pseudo-randomly. Thus, for every access probe sequence, a backoff delay, RS, of from 1 to 1+bkoff slots is generated pseudo randomly. In the case of request access probe sequences, for each slot after the backoff delay RS, the mobile station performs a pseudo-random persistence test. If the persistence test passes, the first probe of the sequence begins in that slot. If the persistence test fails, the access probe sequence is deferred until at least the next slot. Thus, an additional delay, PD, is imposed by the failure of a persistence test.

For each access channel slot, the persistence test comprises generating a random number and comparing this number with a pre-determined threshold. The pre-computed threshold varies, depending on the nature of the request, the access overload class n, the persistence value psist(n) for the overload class, and its persistence modifier msg_psist (for message transmission) or reg_psist (or registrations).

Each access probe sequence consists of up to 1+num_step access probes, all transmitted on the same access channel. The access channel number, RA, used for each access probe sequence is chosen pseudo randomly from 0 to acc-chan among all the access channels associated with the current paging channel. Once chosen, this access channel number is used by the mobile station for all access probes in the current access probe sequence. The first access probe of each access probe sequence is transmitted at a specified power level relative to the nominal open loop power level. Each subsequent access probe is transmitted at a power level a specified amount PI dB (determined from pwr_step) higher than the previous access probe until an acknowledgment response is obtained or the sequence ends. Between access probes, the mobile station typically disables its transmitter.

The mobile station transmits the first probe in each access probe sequence at a mean output power level (referenced to the nominal CDMA channel bandwidth of 1.23 MHz) depending on open loop power estimate, the initial power offset for access init_pwr and the nominal transmit power offset nom_pwr.

Timing of access probes and access probe sequences is advantageously expressed in terms of access channel slots. The transmission of an access probe begins at the start of an access channel slot. The precise timing of the access channel transmissions in an access attempt is determined by a procedure called PN randomization. For the duration of each access attempt, the mobile station computes a delay, RN, from 0 to $2^{probe\_pn\_ran}$ PN chips using a (nonrandom) hash function that depends on its electronic serial number, ESN. The mobile station delays its transmit timing by RN PN chips. This transmit timing adjustment includes delay of the direct sequence spreading long code and of the quadrature spreading I and Q pilot PN sequence, so it effectively increases the apparent range from the mobile to the base station. This increases the probability that the base station will be able to separately demodulate transmissions from multiple mobile stations in the same access channel slot, especially when many mobiles are at a similar range from the base station.

As noted above, a persistence test is performed prior to initiating the access probe sequence to control the timing of mobile transmit requests. The appropriate range of persistence values to be assigned to the mobile stations to effect the desired delay using persistence tests is advantageously determined in terms of average persistence delays as a function of persistence values. This is accomplished for various types of request and access overload classes.

For each access channel slot, the persistence test generates a random number RP ($0<RP<1$) and compares it with a pre-determined threshold P. If the generated random number RP is smaller than the pre-determined threshold P, access probe sequence is initiated. The random number RP is generated from uniform distribution over the unity interval, i.e., $$Pr\{RP<P\}=P$$

Thus, a larger value for P implies a higher probability of initiating the access probe sequence.

The pre-computed threshold P, in general, is different depending on the nature of the request, the access overload class and its persistence value psist(n), as well as its persistence modifier. As an example, for a registration request of access overload classes 0 through 9, if psist(n)=63, then P=0. Thus the persistence test fails, and no access probe sequence is initiated. If psist(n) is not equal to 63, then, for a given persistence modifier reg_psist. P is a monotonic decreasing function of psist(n). The larger psist(n), the smaller P, and the smaller the probability of initiating the access probe sequence.

Table 1 summarizes persistence test thresholds for various types of requests and access overload classes used in systems based on the IS-95-A standard. Table 1 shows that the maximum persistence value is 63 for access overload classes 0 through 9, and is 7 for access overload classes 10 through 15. If the maximum persistence value is assigned to the mobile station, the access attempts fails, and the mobile station enters the so-called system determination substate of the mobile initialization state.

TABLE 1

| | Persistence Test Threshold P | | | |
| --- | --- | --- | --- | --- |
| | access overload classes $n = 0,1,\cdots,9$ | | access overload classes $n = 10, 11,\cdots, 15$ | |
| | psist(n) ≠ 63 | psist(n) = 63 | psist(n) ≠ 7 | psist(n) = 7 |
| Registration Request | $2^{-\frac{psist(n)}{4}-reg\_psist}$ | 0 | $2^{-psist(n)-reg\_psist}$ | 0 |
| Message Request | $2^{-\frac{psist(n)}{4}-msg\_psist}$ | 0 | $2^{-psist(n)-msg\_psist}$ | 0 |
| Other Request | $2^{-\frac{psist(n)}{4}}$ | 0 | $2^{-psist(n)}$ | 0 |

Timing between access probes of an access probe sequence is also generated pseudo-randomly. After transmitting each access probe, the mobile waits a specified period, TA=80×(2+acc_tmo) milliseconds from the end of the slot to receive an acknowledgment from the base station. If an acknowledgment is received, the access attempt ends. If no acknowledgment is received, the next access probe is transmitted after an additional backoff delay RT, from 1 to 1+probe_bkoff slots.

For a persistence value not equal to the maximum, random persistence delays can be incurred to control the transmissions of mobile requests. The value of the persistence delay, PD, indicates the number of times the persistence test should be performed in an access sequence while seeking to have the condition RP<P satisfied. Persistence delay PD is a random variable, with a discrete probability density that is geometric with parameter P, i.e., $$Pr\{PD=k \text{ slots}\}=(1-P)^k P$$

for k=0, 1, 2, . . .

One performance measure to characterize the persistence test is the average persistence delay. Let $E\{\cdot\}$ be the expectation operator. The average persistence delay is $$E\{PD\}=k\ Pr\{PD=k\ \text{slots}\}=(1-P)/P. \qquad (5)$$

Table 2 summarizes average persistence delay for various types of access channel requests as known in systems based on the IS-95-A standard.

TABLE 2

| | Average Persistence Delay E{PD} | | | |
|---|---|---|---|---|
| | access overload classes n = 0,1,•••,9 | | access overload classes n = 10, 11,•••, 15 | |
| | psist(n) ≠ 63 | psist(n) = 63 | psist(n) ≠ 7 | psist(n) = 7 |
| Registration Request | $2^{\frac{psist(n)}{4}+\text{reg\_psist}}-1$ | : | $2^{psist(n)+\text{reg\_psist}}-1$ | : |
| Message Request | $2^{\frac{psist(n)}{4}+\text{msg\_psist}}-1$ | : | $2^{psist(n)+\text{msg\_psist}}-1$ | : |
| Other Request | $2^{\frac{psist(n)}{4}}-1$ | : | $2^{psist(n)}-1$ | : |

Applying Modified Overload Controls

The present invention, in illustrative embodiments, implements algorithms for adjusting the timing of access requests in systems of the type described above to reduce the likelihood of request collisions. These algorithms employ measurements of access channel occupancy, as well as system operator inputs, to develop thresholds and parameter translations at a base station. Access channel occupancy, the percentage of the number of occupied access slots as a fraction or percentage of the number of available access slots within a measurement interval, is the sole overload detection metric used in many embodiments. Operation of the algorithms at a base station advantageously yields modified persistence test parameters to be used at mobile stations.

sequences, thus decreasing the offered RF load on the Access channel. In the present inventive embodiments, however, the values of the persistence parameters are based on observed access channel occupancy.

Each of the several steps used to develop the above-described control strategies will not be examined in greater detail. Initially, the measurement of access channel occupancy will be treated.

Each Access Channel is advantageously arranged to measure its % Access Channel Occupancy, which can be determined as follows:

with each access frame illustratively equal to 20 msec;

M equal to the number of occupied access slots during an illustrative 2-second overload measurement interval;

MAX_CAP_SZ the maximum number of access channel frames in an Access Channel message capsule minus 3; and PAM_SZ the number of frames in the Access Channel preamble minus 1;

$$\text{Interval Capacity} = \frac{50\ \text{frames/sec} \times 2\ \text{sec/interval}}{4+\text{MAX\_CAP\_SZ}+\text{PAM\_SZ}\ \text{frames/slot}} \qquad (1)$$

$$= \frac{100}{4+\text{MAX\_CAP\_SZ}+\text{PAM\_SZ}}\text{slots/interval; and}$$

$$\%\ \text{Interval Occupancy} = \left[\frac{100 \times M\ (\text{slots/interval})}{\text{Interval Capacityn (slots/interval)}}\right]\%$$

$$= \left[\frac{100 \times M \times (4+\text{MAX\_CAP\_SZ}+\text{PAM\_SZ})}{100}\right]\%\ \text{or}$$

$$\%\ \text{Interval Occupancy} = [M \times (4+\text{MAX\_CAP\_SZ}+\text{PAM\_SZ}]\ \%,$$

When overload conditions are present, these modified parameters cause the mobile stations to experience variable delays through judicious control of persistence tests at the mobile stations.

An illustrative control algorithm is invoked when the access overload detection metric exceeds a translatable threshold. Once invoked, the algorithm illustratively adjusts the overload class 0–9 persistence parameters sent to all mobile stations in the Access Parameters Message broadcast on the Paging channel. As for existing IS-95A implementations, changes in persistence parameters can be used to effectively delay or spread out request access attempt In systems other than current versions of the illustrative IS-95-A-based system used for the present discussion the recited constants may vary to reflect particular constraints present in such other systems. Each access frame in the illustrative IS-95-A system is 20 msec in time duration. While the measurement interval may be varied under system operator control to meet particular requirements, an interval substantially shorter than five seconds is advantageous for such measurements to avoid dropping calls at the onset of the Access Channel Overload condition.

It proves useful to define an Access Channel Overload Invocation Threshold, $T_H$, as the value for channel occupancy above which Channel Overload Controls are invoked (or "turned on"). $T_H$ is advantageously selected by the system operator to reflect experience and particular conditions existing in the calling environment. (Typically, the system operator will also set a value for disabling, or turning off, the controls. When the operator enters such a value, the base station will not execute algorithm(s) to modify the persistence parameters sent to mobile stations.) In operating parlance, $T_H$ is conveniently referred to as the invocation trigger, since it acts to invoke overload controls.

In many base station systems it proves convenient to use various translations of measured or calculated values to produce corresponding desired output values. Thus, for example, when a system operator inputs a desired Access Channel Overload Invocation Threshold value, this value will typically be translated (e.g., through well-known table look-up procedures) into a corresponding value to be compared with a measured value of Access Channel Occupancy.

Specifically, if the Access Channel Overload Control is on, and the measured Access Channel Occupancy is above the Access Channel Overload Invocation Threshold translation, then the persistence value for overload class 0–9 mobiles (PSIST (O–9)) will advantageously be increased by an amount specified by an Increase Persistence Step Size translation. Such increases are generally constrained not to cause the PSIST (0–9) value to increase to a value exceeding 63. If an upward step would cause the PSIST(O–9) value to exceed 63, then the value 63 is illustratively used. Such constraints permit reserved values, e.g., for such functions as turning off Access Channel Overload Control.

Channel occupancy conditions change, of course, with time. Thus, hotspot conditions may moderate, either because an emergency condition abates, or because callers refrain from placing new or renewed access requests. When this occurs, the Access Channel Occupancy values determined in accordance with Eq. (1) above decline. This advantageously permits a backing off of previously imposed access delays.

For example, if the Access Channel Overload Control is on, and the current persistence value for the Access Channel is not zero, and the measure of the Access Channel Occupancy is below a lower threshold then the persistence value for overload class 0–9 mobiles, PSIST(O–9), will advantageously be decreased. This lower threshold, $T_L$, is conveniently defined in an illustrative algorithm as $$T_L = 0.8 \times T_H. \quad (2)$$

The amount of decrease in PSIST(O–9) under these circumstances is advantageously obtained from stored table values obtained by a Decrease Persistence Step Size translation, but the value of PSIST(O–9) is constrained to not have a value less than 0.

When, as is common, a base station receives access requests through any of a plurality of access channels in a group of access channels associated with a paging channel, the most restrictive persistence value obtained from measurements over all access channels in the group is advantageously selected as the PSIST(O–9) value for the entire group of access channels.

The foregoing control process can be stated concisely in terms of arrival rates and persistence values in accordance with the following analysis. Thus, for a typical case in which it is desired that the request access channel traffic be controlled to a threshold value $\lambda_T$ for the next K slots (corresponding to T seconds), an illustrative persistence test value P is given by $$P(m) = 1 - \left(1 - \frac{\lambda_T}{\lambda_{mk}}\right)^{\frac{1}{K+1}}, \quad 0 <= k < K$$

The control process can then be stated in terms of a Two-Trigger Access Overload Control (TTAOC) Algorithm, where $T_H$ is the invocation trigger $T_L$ is the lower trigger Let $\lambda$ is the arrival rate of the request access traffic H_Step is the High persistence step size L_step is the Low persistence step size U_Step is the Up persistence step size.

When the controlled traffic $\lambda_{net} = \lambda \cdot P$, where P is the persistence test value, n is the number of occurs in that state, the TTAOC Algorithm can be stated as:

$P = P \cdot 2^{\wedge}(-H\_step)$ If $\lambda_{net} >= T_H$, $P = P \cdot 2^{\wedge}(L\_step)$ If $T_1 <= \lambda_{net} < T_H$ $P = P \cdot 2^{\wedge}(U\_step)$ If $\lambda_{net} < T_1$.

P=1 if P>1

Typical operating parameters used in deriving the Access Overload Control Trigger are:

Detection interval 1 to 3 sec, default=2 sec

Invocation trigger is 90% for 15% interference margin design

Invocation trigger is 70% for 5% interference margin design

A constant 80% of the invocation trigger is used to compute the lower threshold.

Similarly, typical operating parameters used in deriving the Persistence Step Size Access overload High step size is H_Step=1

Access overload Low step size is L_Step=0.25.

Figure 5:
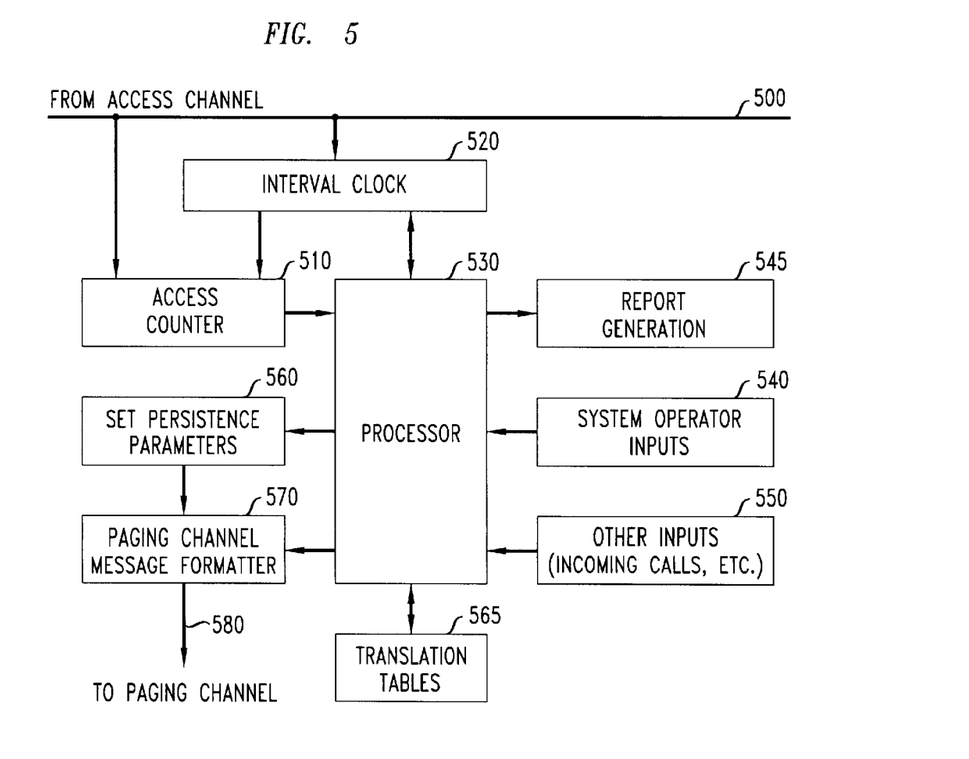
FIG. 5 is a block diagram of a system for generating and applying access controls in accordance with an illustrative embodiment of the present invention.

FIG. 5 illustrates schematically the functions performed at a base station in implementing illustrative control algorithms in accordance with aspects of the present invention. Shown there, is input 500 receiving requests from an access channel in an illustrative IS-95-A-based system. These access requests are counted under the control of interval clock 520 for each measurement period. Processor 530 receives operator inputs from block 540 and is made aware of the activities at the subject base station as reflected by block 550. These inputs will, of course, indicate the present level of call activity as reflected by the present state of the channel overload controls, i.e., the on-off state of such controls. In addition, these inputs will include current persistence parameter values.

Also conveniently generated and stored at processor 530 is the number of occasions during each hour (or other period) during which controls were "on" or invoked. The duration of each such occasion is also advantageously stored, so that the processor can readily provide system activity reports using standard report techniques. Report generation is represented in FIG. 5 by block 545. As an example of reports that are conveniently generated using information derived and stored in employing the present inventive teachings, if access channel(s) on a first carrier of a sector is in overload twice in an hour, once for five minutes, and once for fifteen minutes, the compiled overload metrics would indicate that overload had occurred twice for a total of twenty minutes.

Based on Access Channel Occupancy measured using clock inputs from interval clock 520 and the number of access requests from access counter 510 processor, 530 compares channel occupancy against $T_H$, the Access Channel Overload Invocation Threshold. When controls are on and occupancy exceeds $T_H$, processor 530 uses the current persistence parameter value and a parameter incrementing algorithm to select a new value for the access channel persistence parameter. This is accomplished in typical operation by applying the received and derived inputs to translations table 565 to extract the needed incrementing information. This latter information is then illustratively applied using the Set Persistence Parameter function represented by block 560 in FIG. 5. The updated persistence parameter is then applied to paging channel messaging controls represented by Paging Channel Message Formatter block 570 for formatting a paging message for delivery to the paging channel. Block 570 is also shown receiving inputs from processor 530 to reflect the other contents of the paging channel message.

Many of the functions shown and described above are advantageously performed in a programmed processor and associated memory and peripheral subsystems. No particular processor is required, but any of several available base station processing elements may be employed as circumstances may dictate.

Translations described above are advantageously configured on a per-sector basis to allow service providers to carry different access channel loads on different sectors, and to allow the presently disclosed inventive access channel overload control techniques to be applied to each of these sectors. In particular cases, however, it may prove desirable to specify the translations on a per-carrier basis.

While the present description has dealt only with request access attempts (i.e., originations) and affected persistence tests, the same methodology can be applied to response access attempts (e.g. page responses). In many cases, however, the base station can be configured to limit the number of mobile pages to affected sectors, thus reducing the number of page responses.

Particular parameter values and operating ranges have been used in the prior descriptions, but such values and ranges are merely illustrative. Likewise, the context of systems complying with the IS-95-A standard is merely illustrative. Modification of existing persistence testing as illustratively described above provides a particularly advantageous environment. The principles of the present invention may, however, be applied in a variety of mobile access contexts, and, with suitable modification clear to those skilled in the art, to non-mobile systems as well. As one example, the transmission of an updated persistence parameter to avoid the need to modify IS-95-A mobile station hardware, can be replaced in other systems by sending of modification signals affecting the delay of access requests at mobile (or other) stations.

Operator inputs may be adjusted if system performance using the present invention indicates (as by reports generated in the manner described above) that the overload control algorithm (in one or more of its variations) is turning on and off many times during an hour, a non-optimal lower access channel occupancy threshold may be indicated. It might also be appropriate to reduce persistence step size. Further, if the call drop rate is higher than expected during the time of the overload condition, the access channel occupancy invocation threshold may be non-optimal, and the persistence step size may require adjustment. These adjustments may be accomplished, all within the scope of the present invention, based on operator observation under a variety of operating circumstances.

While the above illustrative systems and methods have been couched in terms of access controls performed at a base station, it will be understood that all or part of the processing employed to generate occupancy, persistence parameter or other system signals may be accomplished at a location remote from individual base station locations. Alternatively, such processing can be performed at one base station location for use by a plurality of base stations.

Other access control methods and associated systems for practicing such methods, all within the scope of the present invention, will occur to those skilled in the art.

What is claimed is:

1. A method for variably delaying access requests over at least one access channel from each of a plurality of terminals to a shared resource, origination of access requests at said terminals being subject to a pseudo-random delay characterized by a first parameter, the method comprising generating one or more occupancy signals reflecting the relative occupancy of said access channels, based on said occupancy signals, generating an adjustment signal representing a modification of said first parameter, and making said adjustment signal available to at least some of said terminals, wherein each of said channels is arranged to receive messages in sequential access slots, each of said slots comprising a plurality of frames, each of said messages comprising a message preamble and a message capsule, and said generating of said one or more occupancy signals reflecting the relative occupancy of said access channels comprises determining for each access channel the % interval occupancy in accordance with $$\% \text{ Interval Occupancy} = [M \times (4 + \text{MAX\_CAP\_SZ} + \text{PAM\_SZ})]\%,$$

where M is the number of occupied access slots during a measurement interval, MAX CAP_SZ is the maximum number of access channel frames in an Access Channel message capsule minus 3, and PAM_SZ is the number of frames in the Access Channel preamble minus 1.

2. The method of claim 1, wherein said adjustment signal represents an incremented value for said first parameter.

3. The method of claim 1, wherein said adjustment signal represents a decremented value for said first parameter.

4. The method of claim 1, wherein said generating of said adjustment signal comprises receiving a first threshold signal, $T_H$, comparing said $T_H$ with said occupancy signal, and generating said adjustment signal in accordance with at least one pre-defined relationship between said occupancy signal and said $T_H$.

5. The method of claim 4, wherein said generating said adjustment signal in accordance with at least one pre-defined relationship comprises generating an adjustment signal to change said first parameter signal to a value tending to increase the delay of said originations.

6. The method of claim 5 wherein said adjustment signal causes said first parameter to be incremented.

7. The method of claim 5 wherein said adjustment signal causes said first parameter to be replaced by a value corresponding to a longer average delay.

8. The method of claim 4 wherein said generating said adjustment signal in accordance with at least one pre-defined relationship comprises generating an adjustment signal to change said first parameter signal to a value tending to decrease the delay of said originations.

9. The method of claim 8 wherein said adjustment signal causes said first parameter to be incremented.

10. The method of claim 8 wherein said adjustment signal causes said first parameter to be replaced by a value corresponding to a longer average delay.

11. The method of claim 1, wherein said channels are mobile communications access channels.

12. A system for variably delaying access requests over at least one access channel from each of a plurality of terminals to a shared resource, origination of access requests at said terminals being subject to a pseudo-random delay characterized by a first parameter, the method comprising means for generating one or more occupancy signals reflecting the relative occupancy of said access channels, and means for generating an adjustment signal based on said occupancy signals, said adjustment signal representing a modification of said first parameter, and making said adjustment signal available to at least some of said terminals, wherein each of said channels is arranged to receive messages in sequential access slots, each of said slots comprising a plurality of frames, each of said messages comprising a message preamble and a message capsule, and said means for generating said one or more occupancy signals reflecting the relative occupancy of said access channels comprises means for determining for each access channel the percent interval occupancy in accordance with Percent Interval Occupancy=$[M \times (4+\text{MAX\_CAP\_SZ}+\text{PAM\_SZ})]$ %, where M is the number of occupied access during a measurement interval, MAX CAP_ is the maximum number of access channel frames in an Access Channel message capsule minus 3, and PAM_ is the number of frames in the Access Channel preamble minus 1.

13. The system of claim 12, wherein said adjustment signal represents an incremented value for said first parameter.

14. The system of claim 12, wherein said adjustment signal represents a decremented value for said first parameter.

15. The system of claim 12, wherein said means for generating said adjustment signal comprises means for receiving a first threshold signal, $T_H$, means for comparing said $T_H$ with said occupancy signal, and means for generating said adjustment signal in accordance with at least one pre-defined relationship between said occupancy signal and said $T_H$.

16. The system of claim 15, wherein said means for generating said adjustment signal in accordance with at least one pre-defined relationship comprises means for generating an adjustment signal to change said first parameter signal to a value tending to increase the delay of said originations.

17. The system of claim 15 wherein said adjustment signal causes said first parameter to be incremented.

18. The system of claim 15 wherein said adjustment signal causes said first parameter to be replaced by a value corresponding to a longer average delay.

19. The system of claim 15 wherein said means for generating said adjustment signal in accordance with at least one pre-defined relationship comprises means for generating an adjustment signal to change said first parameter signal to a value tending to decrease the delay of said access requests.

20. The system of claim 19 wherein said means for generating said adjustment signal causes said first parameter to be incremented.

21. The system of claim 19 wherein said means for generating said adjustment signal causes said first parameter to be replaced by a value corresponding to a longer average delay.

22. The system of claim 12, wherein said access channels are mobile communications channels, and wherein said means for making said adjustment signal available to at least some of said terminals comprises a paging channel.

* * * * *